(12) United States Patent
Oda et al.

(10) Patent No.: US 6,266,498 B1
(45) Date of Patent: Jul. 24, 2001

(54) COLOR IMAGE FORMING APPARATUS WITH A COOLING STRUCTURE FOR COOLING COMPONENTS THEREIN

(75) Inventors: Ayumu Oda, Nara; Norio Tomita, Yamatokoriyama; Yoshikazu Harada, Nara; Takayuki Ohno, Yamatokoriyama; Toshio Yamanaka, Yao; Nobuo Manabe, Yamatokoriyama, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/504,386

(22) Filed: Feb. 15, 2000

(30) Foreign Application Priority Data

Feb. 15, 1999 (JP) .................................................. 11-036411

(51) Int. Cl.[7] ............................ G03G 15/00; G03G 21/00
(52) U.S. Cl. .............................................. 399/92; 347/138
(58) Field of Search ................................ 399/92, 93, 94; 355/30; 347/115, 127, 138, 152

(56) References Cited

FOREIGN PATENT DOCUMENTS

| 3-56980 | | 3/1991 | (JP). |
|---|---|---|---|
| 3-81780 | * | 4/1991 | (JP). |
| 4257880 | | 9/1992 | (JP). |
| 7-177780 | * | 7/1995 | (JP). |
| 7-295463 | * | 11/1995 | (JP). |
| 9-34338 | * | 2/1997 | (JP). |

* cited by examiner

Primary Examiner—Joan Pendegrass

(57) ABSTRACT

A color image apparatus which has a cooling arrangement to help prevent a plurality of light-scanning units for respective colors therein from being adversely influenced by heat from a thermally fixing unit within the apparatus. In a space portion where all light-scanning units are housed, an air-exhausting fan is provided in the vicinity of the light-scanning unit nearest to the thermally fixing unit, and an air hole is formed at a position farthest from the thermally fixing unit. Additionally a temperature sensor is mounted on the light-scanning unit nearest to the thermally fixing unit. Rotation speed of the air-exhausting fan is controlled so that the temperature detected by the sensor does not exceed a predetermined temperature limit.

20 Claims, 5 Drawing Sheets

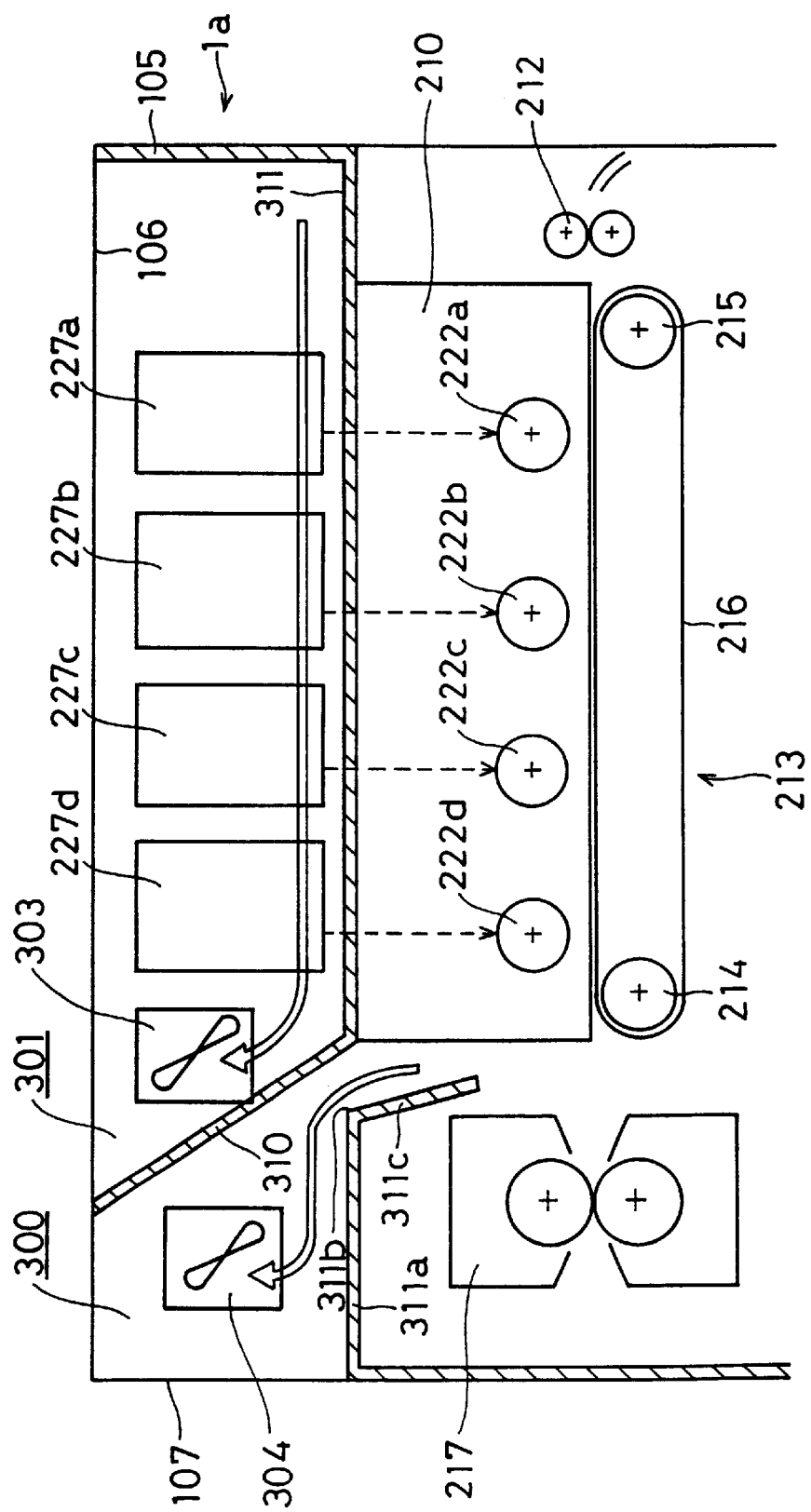

COLOR IMAGE FORMING APPARATUS WITH A COOLING STRUCTURE FOR COOLING COMPONENTS THEREIN

BACKGROUND OF THE INVENTION

1. Field of the Invention

The present invention relates to an electrophotographic type color image forming apparatus such as a printer, a copying machine or the like, and particularly to a structure for cooling light-scanning units in a color image forming apparatus, arranged in a so-called tandem in which a plurality of light-scanning units for respective colors are sequentially arranged along a conveying path of recording sheets of paper.

2. Description of the Related Art

In a digital color copying machine, for example, after image processing is performed on respective color separation images of an original document which has been read by a scanner and input from the scanner, images are formed on photosensitive bodies by image forming means having a light-scanning unit provided for respective colors and are superimposed on a recording sheet of paper to form one color image. In order to form an image for each color, each image forming means includes a photosensitive body on which an electrostatic latent image is formed, a charging device for charging the photosensitive body, a light-scanning unit for exposing a surface of the charged photosensitive body to form an electrostatic latent image, a developing means for attaching toner onto the electrostatic latent image which has been formed on the photosensitive body to visualize the latent image, and the like. A recording sheet of paper with a color image obtained by superimposing the developed images on the recording sheet of paper is then conveyed to a thermally fixing or fusing means, where toner forming a visualized or color image is fused or melted onto the recording sheet of paper. Thereafter the recording sheet of paper is ejected outside the machine body.

In such a digital color copying machine, images of respective colors are reproduced faithfully and the images of the respective colors are superimposed on a recording sheet of paper with a high accuracy. This is an image representation included in an original image can be accurately reproduced. Recently, however, in order to minimize a space for installing an apparatus, compact-sizing and downsizing of an apparatus are needed. As a result, a drawback or problem has developed where constituting elements inside the apparatus are isolated from one another, and also interfere with one another. Particularly, when the interior of the apparatus is elevated to a high temperature, distortion, flexure, torsion and the like occur due to thermal expansions of respective elements in an optical device portion, such as a light-scanning unit or the like, and the image to be recorded is this adversely influenced in an image-writing step.

In view of the above, an apparatus has been developed and structured such that air flow is generated between image forming means (which is a processing portion for recording and reproducing an image) and thermally fixing means generating the highest heat in an apparatus, so that heat generated from the thermally fixing means does not influence the processing portion. In Japanese Unexamined Patent Publication JP-A 3-56980 (1991), partition walls are provided among a photosensitive body drum unit, an optical system unit and a fusing or fixing unit, and respective airs in spaces isolated by the partition walls are sucked and exhausted by one fan, thereby making it unnecessary to provide a duct. Thus, a air flow path is formed as a duct and heat atmosphere about heat sources is exhausted forcibly, thereby suppressing increase in temperatures of peripheral devices. Similarly, in Japanese Unexamined Patent Publication JP-A 4-257880 (1992), also, an upper portion of thermally fixing means and a photosensitive body module are cooled by one fan.

In these prior art apparatus, however, there is no consideration or disclosure related to a digital color copying machine this is provided with a plurality of light-scanning units for respective colors, and with a plurality of image forming means.

In a digital color reproducing machine, when the respective light-scanning units are influenced by the heat of a thermally fixing or fusing means, images of respective colors are not faithfully reproduced respectively. Thus a color shear occurs even when the respective images are accurately superimposed on a recording paper, thereby injuring or deteriorating the image quality of a color image formed on the recording sheet of paper. As a result, in an image forming apparatus where a plurality of light-scanning units are arranged in tandem along a conveying path of recording sheets of paper, there is still room for improvement, so that influence due to heat generated by the fixing means is suppressed to a low level and a high image quality of an image is obtained.

Also, in the conventional art, in order to reduce influence due to heat, when a exhausting flow rate of air in the periphery of the thermally fixing means is increased, temperature lowering within the thermally fixing means itself may conversely occur. In the worst case, since there occurs a problem such as poor fixing or the like due to insufficient fixing temperature would occur, there is a further limitation in a structure where cooling depends on only cooling the periphery of the thermally fixing means.

SUMMARY OF THE INVENTION

An object of the invention is to provide a color image forming apparatus which can record and reproduce an image faithfully without causing a problem such as poor fixing due to temperature lowering within a thermally fixing means, and where a light-scanning unit is not adversely influenced by heat from the fixing means.

The invention relates to a color image forming apparatus comprising:

(a) a plurality of image forming means for respective colors, sequentially disposed along a conveying path of a recording medium, the plurality of image forming means each comprising
   a photosensitive body,
   light-scanning unit for forming an electrostatic latent image on the photosensitive body,
   developing means for visualizing the electrostatic latent image on the photosensitive body with color toners, and
   transferring means for transferring a toner image formed on the photosensitive body on to the recording medium on a conveying path;

(b) thermally fixing means, disposed further downstream from the image forming means arranged most downstream on the conveying path in a conveying direction of the recording medium, for thermally melting a toner image on the recording medium to fix the toner image on the recording medium;

(c) partition members 310, 311 for surrounding at least all of the light-scanning units of the image forming means to form a light-scanning-unit space portion 301 and isolate the light-scanning-unit space 301 from the thermally fixing means; and (d) a fan 303, disposed in a vicinity of the light-scanning unit nearest to the thermally fixing means, for guiding air from the light-scanning-unit space portion 301 to an outside of an apparatus body or guiding air from the outside of the apparatus body to the light-scanning-unit space portion 301.

According to the invention, corresponding toner images formed by the plurality of image forming means which respectively have the light-scanning unit are sequentially superimposed to form one image, and the one image is thermally melted and thermally fixed on the recording medium by the thermally fixing means. All the light-scanning units are disposed within the light-scanning-unit space portion 301 which is isolated by the partition members 310, 311. The fan 303 is provided in the light-scanning-unit space portion 301, and fan 303 is disposed in the vicinity of the light-scanning unit nearest to the thermally fixing means. Accordingly, air flow rate obtained by the fan 303 can be made larger in the vicinity of the light-scanning unit, which is near to the thermally fixing means and which is adversely influenced easily by heat from the thermally fixing means, than in the vicinity of the positions of the remaining light-scanning units. Therefore, a cooling effect on the light-scanning unit, which is influenced typically adversely by heat of the thermally fixing means, can be improved. As a result, distortion, flexure and torsion occurring in elements constituting the light-scanning unit which is due to thermal expansion of the light-scanning unit, can be effectively suppressed. Thereby, images scanned and formed by the respective light-scanning unit of the respective image forming means are faithfully repreduced, and an image obtained by sequentially superimposing the images for respective colors results in a color image that does not evidence a color shear.

According to the invention, air is introduced into the light-scanning-unit space portion 301 by the fan 303, thereby allowing the light-scanning unit to be efficiently cooled, and the air introduced is prevented from contacting with the thermally fixing means, thereby allowing the thermally fixing means to perform thermally fixing operation at a temperature suitable for thermally fixing, where there is no fear of the occurrence of poor fixing.

Another element or other elements constituting the image forming means may be housed in the light-scanning-unit space portion 301. The fan 303 may be an exhausting fan for exhausting air from the light-scanning-unit space portion 301 to the outside of the apparatus body or may be a forced draft fan for forcing air into the light-scanning-unit space portion 301 from the outside of the apparatus body.

The partition members 310, 311 may include a partition member 310, a bottom plate 311, a ceiling plate 106, a side plate 105 a front plate 103, a rear plate 104 and the like, which make it unnecessary to provide a duct as a separate part. As a result, the number of parts and manufacturing cost can be not only reduced but also the light-scanning unit can be cooled efficiently with a high cooling effect, because an outer surface of the light-scanning unit itself comes in direct contact with air and is cooled, as compared with a structure where a duct is provided separately. Thus, air guided by the fan 303 comes in contact with an outer peripheral surface of the light-scanning unit to be cooled efficiently, as described above.

According to the invention, air guided by the fan 303 does not cause temperature lowering of the thermally fixing means and therefore does not cause such a problem as poor fixing and the like. All of the plurality of light-scanning units for respective colors are prevented from being influenced adversely by heat, and an image can be recorded and reproduced faithfully without influence of heat.

Furthermore, according to the invention, at least all of the light-scanning units constituting the image forming means are housed in the light-scanning-unit space portion 301 and therefore it is unnecessary to provide a duct separately, so that all the light-scanning units can be cooled efficiently and the number of parts and manufacturing cost can be reduced.

In the invention it is preferable that an air hole 101 for introducing or exhausting air is formed at a position of the light-scanning-unit space portion 301 which is farthest from the thermally fixing means.

According to the invention, the air hole 101 of the light-scanning-unit space portion 301 is provided at a position which is farethest from the thermally fixing means. Accordingly, air flows smoothly over every corners within the light-scanning-unit space portion 301 between the air hole 101 and the fan 303 disposed in the vicinity of the light-scanning unit nearest to the thermally fixing means, so that a cooling effect on the light-scanning units can be improved and the formation of a region where air stays is prevented in the light-scanning-unit space portion 301.

According to the invention, the air hole 101 is provided at a position of the light-scanning-unit space portion 301, farthest from the thermally fixing means, thereby preventing air in the light-scanning-unit space portion 301 from staying therein and allowing all the light-scanning units to be efficiently cooled.

Also, in the invention it is preferable that the partition members 310, 311 form a thermal-fixing-side space portion 300 above the thermally fixing means, and the color image forming apparatus further comprises a second fan 304 for guiding air from the thermal-fixing-side space portion 300 to the outside of the apparatus body and from the outside of the apparatus body to the thermal-fixing-side space portion.

The thermal-fixing-side space portion 300 is formed above the thermally fixing means by the partition members 310, 311, ceiling plate 106 and a side plate 107, and air is introduced into the thermal-fixing-side space portion 300 by the second fan 304, so that the thermal-fixing-side space portion 300 is cooled. Accordingly, transmission of heat from the thermal fixing means to the light-scanning-unit space portion 301 is suppressed. Furthermore, by driving the respective fans 303, 304 in the light-scanning unit space portion 301 and the thermal-fixing-side space portion 300, the light-scanning units can be efficiently cooled, as described above, and adverse influence due to heat can be prevented. In addition, there is no fear of direct contact of air with the thermally fixing means to cool the same, and the thermally fixing means can perform a thermally fixing operation at a temperature suitable for thermal fixing, where there is no possibility that poor fixing may occur.

According to the invention, since the thermal-fixing-side space portion 300 is formed above the thermally fixing means by the partition members 310, 311, ceiling plate 106 and side plate 107, and air is introduced into the thermal-fixing-side space portion 300 by the second fan 304, heat from the thermally fixing means can be securely prevented from adversely influencing the light-scanning units, and there is no possibility that the thermally fixing means is cooled when air is guided by the respective fans 303, 304 from the light-scanning-unit space portion 301 and the thermal-fixing-side space portion 300, so that poor fixing can securely be prevented from occurring.

It is preferable that the color image forming apparatus further comprises a temperature sensor 306 for detecting a temperature in a vicinity of the most downstream light-scanning unit, and control means 305, in response to an output of the temperature sensor 306, for controlling rotation speed of the fan 303, 304 of the light-scanning-unit space portion 301 or thermal-fixing-side space portion 300 to prevent the temperature in the vicinity of the most downstream light-scanning unit detected by the temperature sensor 306 from increasing to a predetermined value or more.

According to the invention, the temperature of the light-scanning unit nearest to the thermally fixing means is detected by the temperature sensor 306 and the rotation speed of the fan 303 of the light-scanning-unit space portion 301, the fan 304 of the thermal-fixing-side space portion 300 or both the fans 303, 304 is controlled by the control means 305, so that the temperature, which is detected by the temperature sensor 306, can be maintained so as not to increase to the predetermined value or more, for example, a predetermined temperature in the range of 40 to 50° C. or more, thereby suppressing temperature increase of the light-scanning unit securely.

Furthermore, the temperature sensor 306 is provided so as to be directly fixed to a light-scanning unit 227d nearest to the thermally fixing means itself or spaced therefrom, so that the temperature of the light-scanning unit nearest to the thermally fixing means is detected and it is unnecessary to detect the temperatures of other or the remaining light-scanning units 227a to 227c, thereby making it unnecessary to provide temperature sensors for detecting the temperatures of the remaining light-scanning units. Accordingly, the temperature states of all of the light-scanning units can be grasped and adverse influence on the respective light-scanning units due to heat can be reduced while increase in the number of parts and manufacturing cost is suppressed.

According to the invention, since the temperature sensor 306 is provided in the vicinity of the light-scanning unit 227d nearest to the thermally fixing means and the detection temperature obtained by the temperature sensor 306 is controlled by the control means 305 so as not to become the predetermined value or more, the temperature states of all of the light-scanning units 227a to 227d can be grasped and it is unnecessary to detect the temperatures of the remaining light-scanning units 227a to 227d respectively, so that adverse influence on the respective light-scanning units due to heat can be reduced while increase in the number of parts and manufacturing cost is suppressed.

It is also preferable that the partition member is formed of heat insulating material. Additionally, the light-Scanning-unit space portion 301 and the thermally fixing side space portion 300 are formed by the partition member. The section which forms the thermally fixing side space portion 300 is provided with the opening 311b, which is arranged between the thermally fixing means and the image forming means. The first fan 303 is disposed in the light-scanning-unit space portion 301. The second fan 304 is disposed in the thermally fixing side space portion 300.

Air heated by the heat of the thermally fixing means 217 in the light-scanning-unit space portion 301 is exhausted to the outside of the apparatus by the first fan 303, thereby the light-scanning units in the light-scanning-unit space portion 301 are air-cooled. In addition, since the first fan 303 is disposed in the thermally fixing means 217 side of higher temperature, the first fan 303 can effectively cool the light-scanning unit closer to the thermally fixing means 217, which light-scanning unit is relatively susceptible to the heat of the thermally fixing means. Therefore, it is possible that the difference in temperature among the light-scanning units is small and the color shear of the formed color image is reduced.

Also, when the second fan 304 rotates, air below the thermally fixing space portion 300 is sucked into the space portion 300 via the opening 311b of the partition member, so that an upward air flow or air curtain is formed between the image forming portion 210 and the thermally fixing means 217. The heat transfer from the thermally fixing means 217 to the image forming means is suppressed by the air curtain with the that the temperature of the image forming portion 210 is less increased. Thereby any welding or coagulation of the toner can be prevented.

In particular, by providing the section which forms the thermally fixing side space portion 300, with a projecting piece 311c which extends downward from the thermally fixing means side end of the opening 311b, a space of an air layer where there is no air-flow generated by a fan or the like is formed above the thermally fixing means 217. Due to this space, a heat insulating effect on the thermally fixing means 217 is elevated, so that the temperature of the thermally fixing means is maintained. Furthermore, in the case where the partition member is formed of heat insulating material, the temperature holding effect of the thermally fixing means 217 can be further enhanced. Therefore, power consumption can be reduced and fixing performance can be stabilized, to obtain high image quality can.

BRIEF DESCRIPTION OF THE DRAWINGS

Other and further objects, features, and advantages of the invention will be more explicit from the following detailed description taken with reference to the drawings wherein:

FIG. 5 is an enlarged and simplified front view showing a section including space portions 300, 301, an image forming section 210, a transferring/conveying belt mechanism 213 and a thermally fixing means 217 of a digital copying machine 1a of another embodiment of the invention.

DETAILED DESCRIPTION OF THE PREFERRED EMBODIMENTS

Figure 1:
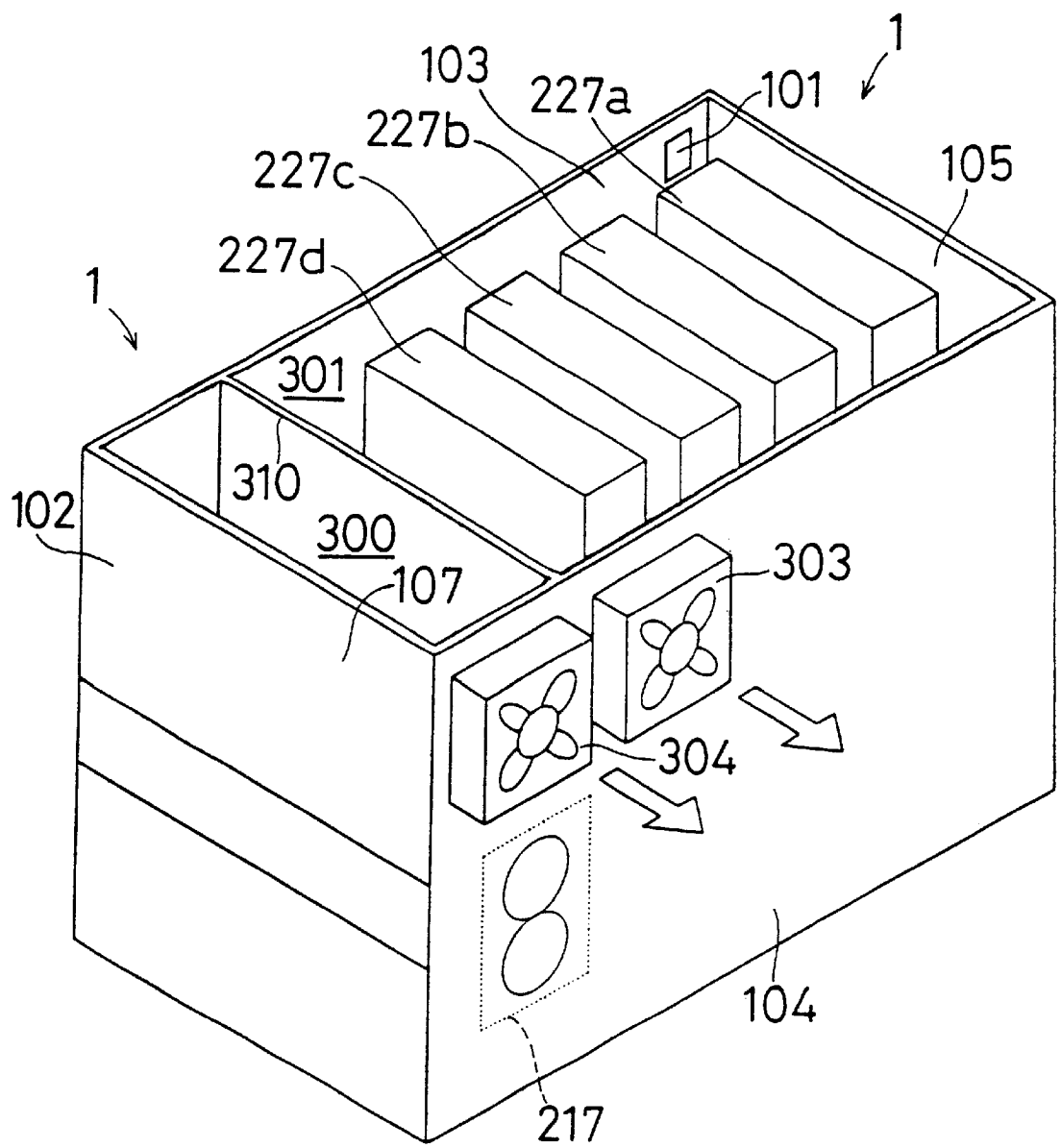
FIG. 1 is a perspective view showing an embodiment of the invention cut out partially.

Now referring to the drawings, preferred embodiments of the invention are described below.

FIG. 1 is a perspective view showing an embodiment of the invention cut out partially. Light-scanning units 227a to 227d (hereinafter, whose subscripts 'a' to 'd' are omitted and which are represented by reference numeral 227 collectively in some cases) for respective colors of a digital color copying machine (copier) 1 are provided within a light-scanning-unit space portion 301, and air is sucked from an air hole 101 into the space portion 301 of an apparatus body 102 and air inside the space portion 301 is exhausted by an exhaust fan 303. The air hole 101 is formed in a front plate 103 and the fan 303 is mounted on a rear plate 104 of the copying machine 1.

Figure 2:
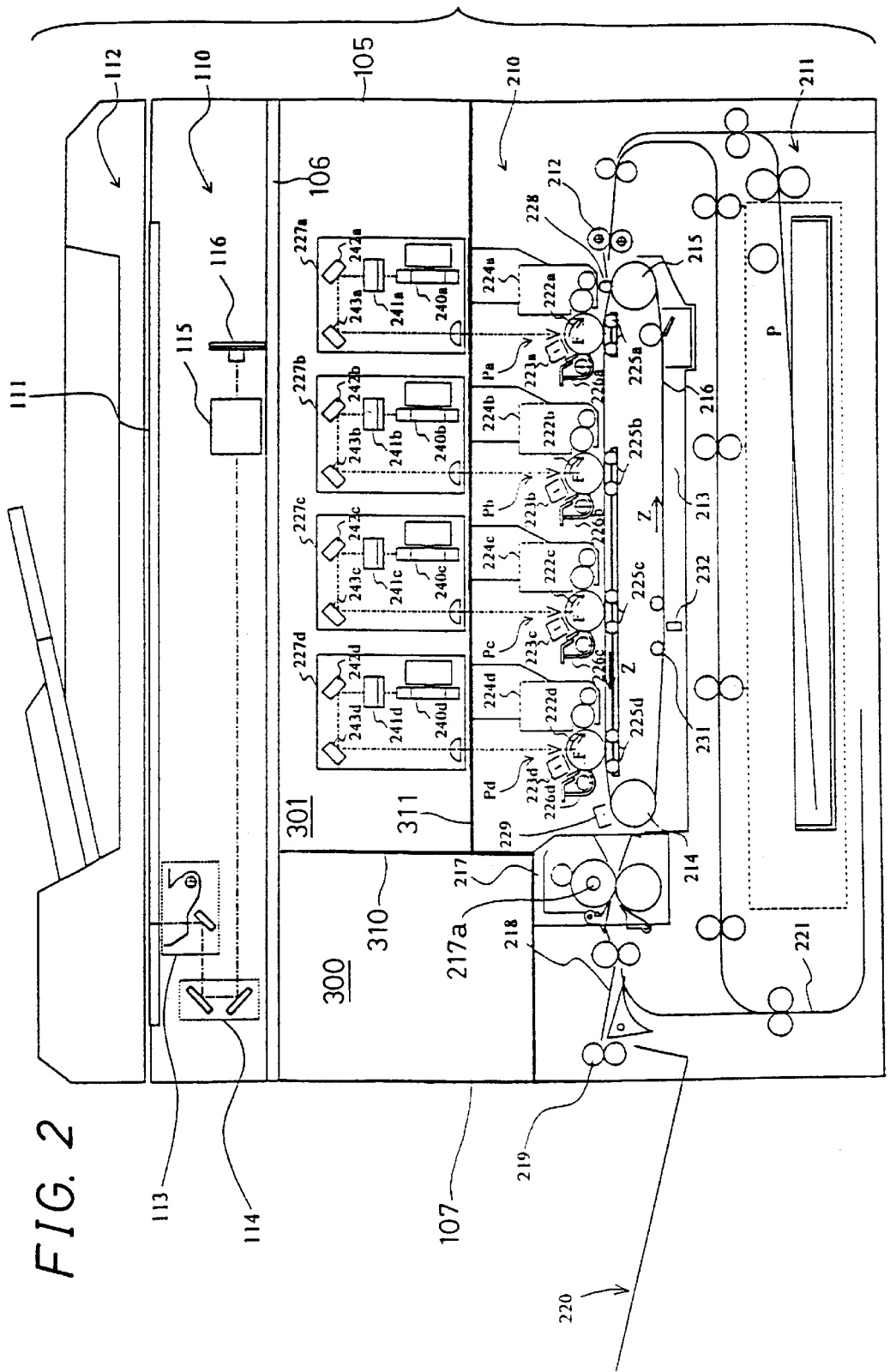
FIG. 2 is a simplified front sectional view showing a structure of the entire of a digital color copying machine 1 shown in FIG. 1.

FIG. 2 is a simplified front sectional view showing a structure of the entire of the digital color copying machine 1 shown in FIG. 1. An original document stand 111 and an operation panel are provided on an upper face of the body of the copying machine 1, and an image reading section 110 and an image forming section 210 are provided within the body of the copying machine 1. An RADF (Recirculating Automatic Document Feeder) 112 is supported on an upper face in a state where the RADF can be opened/closed to the original document stand 111 and has a predetermined positional relationship to the original document stand 111.

The RADF 112 conveys an original document such that one side (face) of an original document is opposed to the image reading section 110 at a predetermined position on the original document stand 111. After an image on the one side has been read, the RADF 112 reverses the original document such that the other side thereof is opposed to the original image reading section 110 of the document stand 111 and feeds the original document towards the original document stand 111. After both sides of one original document have been read, the RADF 112 ejects the original document and performs a recirculating automatic document feeding operation on the next original document. The document feeding and reversing operation is controlled in relation to operations of the entire copying machine.

The image reading section 110 is disposed below the original document stand 111 in order to read an image on an original document conveyed on to the original document stand 111 by the RADF 112. The image reading section 110 includes original document stand scanning bodies 113, 114 which reciprocate in parallel to an lower face of the original document stand 111 along the lower face, an optical lens 115, and a CCD (charge coupled device) linear sensor 116 which is a photoelectric conversion device.

The original document scanning bodies 113, 114 respectively comprises a first scanning unit 113 and a second scanning unit 114. The first scanning unit 113 has an exposure lamp for exposing a document image surface, and a first mirror for deflecting reflected light image from an original document towards a predetermined direction, and reciprocates at a predetermined speed in parallel to an lower face of the original document stand 111 with a predetermined distance from the lower face. The second scanning unit 114 has second and third mirrors for further deflecting the reflected light image of the original document which has been deflected by the first mirror of the first scanning unit 113 in a predetermined direction, and reciprocates with a predetermined speed relationship with the first scanning unit 113 in parallel thereto.

The optical lens 115 reduces the reflected light image of the original document which has been deflected by the third mirror of the second scanning unit to focus the reduced light image at predetermined position on the CCD linear sensor 116.

The CCD linear sensor 116 performs sequential photoelectric conversion on the focused light image to output the image as electrical signals. The CCD linear sensor 116 is a color CCD with three lines which can receive a white and black image or a color image to output line data which is obtained by performing color separation of the image into respective color components of R (red), G (green) and B (blue). Information about an original document image which has been converted into electrical signals by the CCD linear sensor 116 is transferred or transmitted to an image processing section such as a microcomputer where the information is subjected to predetermined image data processing.

A structure or configuration of the image forming section 210 and structures of respective portions associated with the image forming section 210 will be explained. A paper feeding mechanism 211 for separating recording sheets of paper (recording medium) P stacked and received in a paper tray one by one to supply the same towards the image forming section 210 is provided below the image forming section 210. The recording sheets of paper P which have been separated one by one to be supplied are timed and conveyed to the image forming section 210 by a pair of register rollers 212 disposed before the image forming portion 210. Furthermore, the recording sheet of paper P whose one side has been formed with an image is supplied and conveyed to the image forming section 210 again in time to image forming performed by the image forming section 210.

A transferring/conveying belt mechanism 213 is disposed below the image forming section 210. The transferring/conveying belt mechanism 213 is structured so as to electrostatically attract and convey a recording sheet of paper P on a transferring/conveying belt 216 which is bridged between a driving roller 214 and an idle roller 215 so as to extend in almost parallel manner. A fixing-side space portion 300 is provided below the transferring/conveying belt 216 near thereto.

Thermally fixing or fusing means 217 for fixing or fusing a toner image which has been transferred and formed on the recording sheet of paper P is disposed downstream of the transferring/conveying belt mechanism 213 on a paper conveying path. The recording sheet of paper P which has passed through a nip between a pair of fixing or fusing rollers of the thermally fixing means 217 is ejected by ejected rollers 219 on to an ejected paper tray 220 mounted on an outer wall of the body of the copying machine 1 via a conveying direction selector gate 218.

The selector gate 218 is for switching a conveying path for the recording sheet of paper P after fixed between a path for ejecting the recording sheet of paper P to the copying machine body 1 and a path for supplying the recording sheet of paper P towards the image forming section 210 again. After the recording sheet of paper P whose conveying direction has been switched towards the image forming section 210 by the selector gate 218 again is reversed through a switchback conveying path 221, the recording sheet of paper P is supplied to the image forming section 210 again.

Also, a first image forming station Pa, a second image forming station Pb, a third image forming station Pc and a fourth image forming station Pd are arranged above the transferring/conveying belt 216 in the image forming section 210 near to the transferring/conveying belt 216 in this order from the upstream on the paper conveying path. The transferring/conveying belt 216 is frictionally driven by the driving roller 214 in a direction shown with arrow Z in FIG. 2, and grasps the recording sheet of paper P fed through the paper feeding mechanism 211, as described above, to convey the recording sheet of paper P to the image forming stations Pa to Pd sequentially.

The respective image forming stations Pa to Pd have the substantially same configuration. The respective image forming stations Pa to Pd respectively include photosensitive body drums 222a, 222b, 222c and 222d which are rotationally driven in directions shown with arrows F in FIG. 2. In the peripheries of the respective photosensitive body drums 222a to 222d, charging devices 223a, 223b, 223c and 223d for respectively charging the photosensitive body drums 222a to 222d uniformly, developing devices 224a, 224b, 224c and 224d for respectively developing electrostatic latent images which have been formed on the photosensitive body drums 222a to 222d, discharging devices 225a, 225b, 225c and 225d for transferring developed toner images which have been formed on the photosensitive body drums 222a to 222d on the recording sheet of paper P, and cleaning devices 226a, 226b, 226c and 226d for removing residual toners on the photosensitive body drums 222a to 222d are disposed sequentially along rotation directions of the photosensitive body drums 222a to 222d.

Laser beam scanner units (hereinafter each being referred to as LSU) 227a, 227b, 227c and 227d which are light-scanning units are respectively provided above the respective photosensitive body drums 222a to 222d. The LSUs 227a to 227d are constituted with semiconductor laser elements (not shown) which respectively emit dot lights which have been modulated according to image data, polygon mirrors (deflecting devices) 240 which respectively deflect laser beams from the semiconductor laser elements in main scanning directions, fθ lenses 241 which respectively focusing the laser beams which have been deflected by the polygon mirrors 240 on the photosensitive body drums 222a to 222d, mirrors 242, 243, and the like.

From the image processing section, pixel signals corresponding to a black color component image of an color original document image, pixel signals corresponding to a cyan color component image of the color original document image, pixel signals corresponding to a magenta color component image of the color original document image, and pixel signals corresponding to a yellow color component image of the color original document image are respectively input to the LSU 227a, the LSU 227b, the LSU 227c and the LSU 227d. Thereby, electrostatic latent images corresponding to original document image information which has been subjected to color conversion are respectively formed on the respective photosensitive body drums 222a to 222d. Black color toner, cyan color toner, magenta color toner, and yellow color toner are respectively accommodated in the developing device 224a, the developing device 224b, the developing device 224c, and the developing device 224d, and respective electrostatic latent images on the photosensitive body drums 222a to 222d are developed with the respective color toners. Accordingly, the original document image information which has been subjected to the color conversion at the image forming section 210 is reproduced as toner images for respective colors.

A charging device 228 for attracting a recording sheet of paper (a brush) is provided between the first image forming station Pa and the paper feeding mechanism 211. The charging device 228 for attracting a recording sheet of paper charges a surface of the transferring/conveying belt 216, so that the recording sheet of paper P which has been supplied from the paper feeding mechanism 211 is conveyed without skew from the first image forming station Pa to the fourth image forming station Pd in a state where the recording sheet of paper P has been securely attracted on the transferring/conveying belt 216.

A charge eliminating device 229 is provided generally just above the driving roller 214 between the fourth image forming station Pd and the thermally fixing means 217. Alternating current for separating the recording paper P which has been electrostatically attracted on the transferring/conveying belt 216 from the transferring/conveying belt 216 is applied to the charge eliminating device 229.

In the digital color copying machine configured in the above, a cut-sheet type recording paper P is used as the recording paper P. When the recording paper P is fed out from a paper feeding cassette to be supplied into a guide of the paper conveying path of the paper feeding mechanism 211, a leading end portion of the recording paper P is detected by a sensor (not shown), and the recording paper P is stopped once and timed by the pair of register rollers once on the basis of a detection signal output from the sensor. The recording paper P is supplied on to the transferring/conveying belt 216 which is rotating in the arrow Z direction in FIG. 1 in time to the respective image forming stations Pa to Pd. At this time, since the transferring/conveying belt 216 has been subjected to a predetermined charge by the charging device 228 for attracting, as describe above, the recording paper P is conveyed and supplied in a stable manner while passing through the respective image forming stations Pa to Pd.

In the respective image forming stations Pa to Pd, respective color toner images are formed and are superimposed on a supporting surface of the recording paper P which is electrostatically attracted and conveyed by the transferring/conveying belt 216. When transferring an image by the fourth image forming station Pd is completed, the recording paper P is peeled off from its leading end by the discharge device for eliminating charge portion smoothly out of the transferring/conveying belt 216 to be introduced into the thermally fixing means 217. Finally, the recording paper P on which a toner image has been formed is ejected from a recording paper ejecting port (not shown) into the ejected paper tray 220.

In the above explanation, light writings on the photosensitive bodes are performed by scanning laser beams and exposing by the LSUs 227a to 227d. In another embodiment, a writing optical system comprises a light-emitting diode array and a focusing lens array (namely, a light-emitting diode LED head) can be used instead of the LSU. The LED head has a size smaller than that of the LSU, and it has no movable portion and is silent. Accordingly, the LED can be suitably used in an image forming apparatus such as a digital color copying machine of a tandem type wherein a plurality of light-writing units are required.

As shown in FIG. 2, in the digital color copying machine 1, a space positioned above the thermally fixing means 217 is isolated from peripheral devices by a partition wall 310 and a lower face of the image reading section 110 of the copying machine 1 to form a light-scanning-unit space portion 300. A space 301 where the LSUs 227a to 227d are arranged in a tandem manner is also isolated by a side wall 105 of the apparatus, the partition wall 310, a lower face of the image reading section 110, and a bottom plate which defines a space below, the space including the image forming stations Pa to Pd arranged. Thus, the space portion 301 is formed. The space portion 301 is further formed by a front plate 103, a rear plate 104, a side wall 105, a ceiling plate 106 and the partition wall 310. Hereinafter, the space portion 300 is referred to as a fixing-side space portion and the space portion 301 is referred to as an LSU side space portion in some cases. FIG. 1 is an illustrative perspective view showing a structure of a lower portion of the digital color copying machine 1 where the image forming section 110 is omitted, and where the copying machine 1 is illustrated such that its rear side is a front side of FIG. 1 and its front side is a depth side thereof. As shown in FIG. 1, the exhaust fan 304 for exhausting air to the outside of the apparatus body is connected to the fixing-side space portion 303 on the rear side of the copying machine 1. Air inside the space portion 300 heated up by heat from the thermally fixing means 217 disposed below the exhaust fan 304 is exhausted to the outside of the body of the machine by rotation of the exhaust fan 304, so that the thermally fixing means 217 is air-cooled. In the space portion 300, air is sucked or exhausted from clearances or gaps among the partition wall 310, the front plate 103, the rear plate 104, the side plate 107 and the ceiling plate 106.

The LSU side space portion 301 is also connected with the exhaust fan 303 for exhaust air to the outside of the apparatus or the machine body like the above. Air inside the space portion 301 heated up by heat from thermally fixing means 217 shown obliquely downward and leftward in FIG. 2 is exhausted to the outside of the apparatus by rotation of the exhaust fan 303, so that the respective LSUs 227a to 227d disposed in the space portion 301 are air-cooled.

Figure 3:
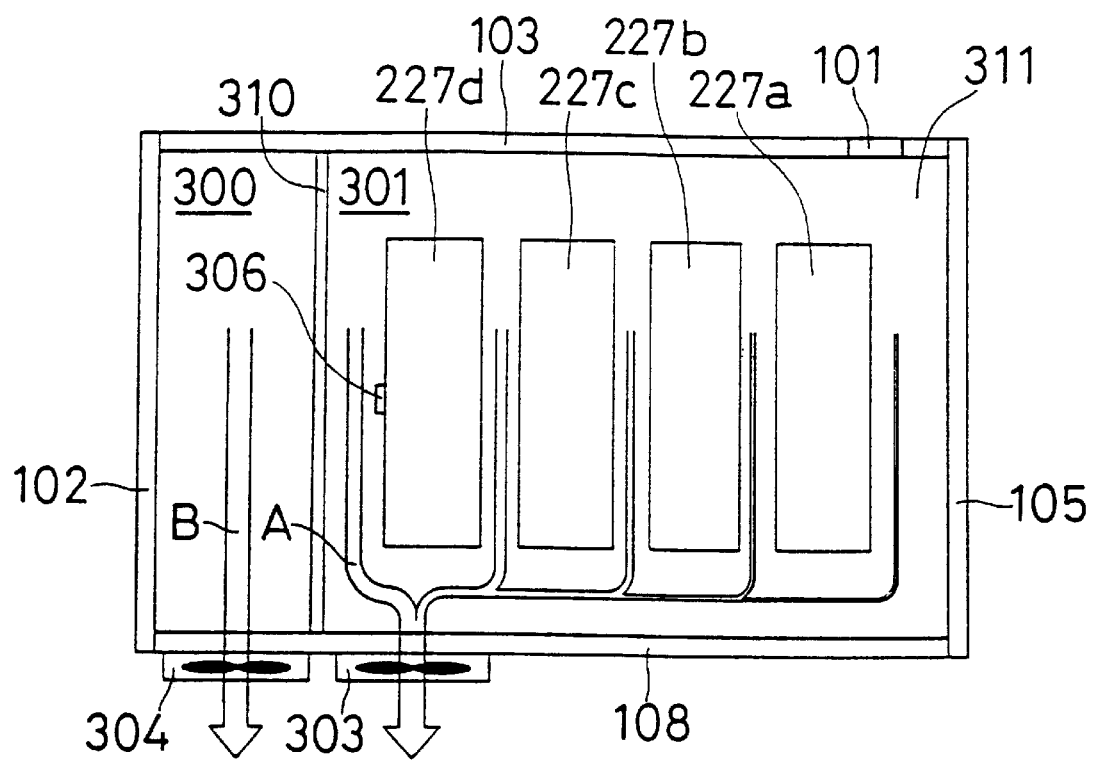
FIG. 3 is a simplified plan view of a portion of the copying machine 1 shown in FIG. 1.

FIG. 3 is a simplified plan view of a portion of the copying machine 1 shown in FIG. 1. In FIG. 3, an air flow path formed within the LSU side space portion 301 is indicated by arrow A. Arrow B is an air flow path formed within the fixing-side space portion 300.

The air flow path indicated by arrow A is formed by the walls 105, 103 and 108 (three directions) defining the space portion 301, the partition wall 310, the bottom plate 311, the ceiling plate 106 which is a lower face of the image reading section 110, unit walls of LSUs themselves constituting the respective LSUs 227a to 227d, i.e., the base bodies. Thereby, the number of parts is reduced and manufacturing cost is also reduced, as compared with a structure where a duct is formed as a separate member. Since the unit walls themselves of the LSUs 227a to 227d form the air flow path, direct heat exchange is performed between the air flowing and the LSUs 227a to 227d, which is higher in cooling effect than the structure where an duct is provided as a separate member.

In the LSU side space portion 301, the exhaust fan 303 is provided at a position nearest to the thermally fixing means 217, or in the vicinity of the LSU 227d which tends to be most influenced by the thermally fixing means. The flow rate of air flowing in the air flow path is made high at the periphery of the LSU 227d which tends to be most influenced by the heat, while the flow rate is reduced according to spacing farther from the thermally fixing means 217. Accordingly, the LSU 227d which tends to be most heated can be cooled effectively. Each light-scanning unit 227 includes a base body made from, for example, synthetic resin and having an outer configuration of an almost rectangular parallelepiped shape. The optical elements such as the semiconductor laser element, the polygon mirror 240, the fθ lens 241, the mirrors 242, 243 are mounted and housed in the base body. As apparent from FIG. 3, air flow paths are formed among the respective LSUs 227, the front plate 103 and the rear plate 108 between the partition wall 310 and the side wall 105. The flow rates of airs in the respective air flow paths are maximized in the vicinity of a place on which the exhaust fan 303 is disposed, and the flow rates become smaller as are spaced farther from the exhaust fan 303. In FIG. 3, these flow rates are indicated with widths of reference sign A.

Figure 4:
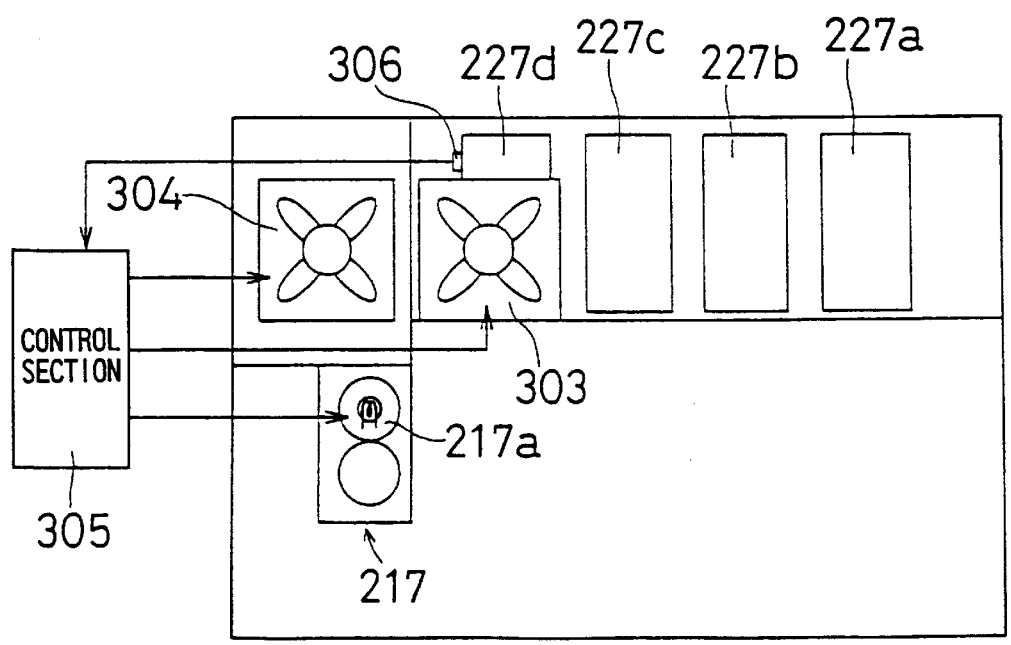
FIG. 4 is a simplified diagram showing an electrical configuration of the embodiment shown in FIGS. 1 to 3.

FIG. 4 is a simplified view of an electrical configuration of the embodiment of the invention. In the digital color copying machine 1, as shown in FIG. 4, at least one of the exhaust fan 303 on the LSU side, the exhaust fan 304 on the thermally fixing means side, and a heat source 217a of the thermally fixing means 217 is controlled by a control section 305 equipped in the digital color copying machine 1 in response to the temperature of the LSU 227d such that an image to be formed is not influenced. Thus, since the control section 305 collectively controls three components; the exhaust fan 303 on the LSU side, the exhaust fan 304 on the thermally fixing means side and the heat source 217a of the thermally fixing means 217 in order to perform temperature adjustment, it can present any lowering of temperature of the thermally fixing means 217 excessively in a conventional manner. Further, the detection temperature is controlled so as to be within a predetermined value or less, for example less than or equal to 40 to 50°. Accordingly, influence due to heat emanating from LSUs 227a to 227dcan be avoided.

It is possible to respectively detect and control the temperatures of the respective LSUs 227a to 227d. However, as shown in FIGS. 3 and 4, in the digital color copying machine 1, the temperature sensor 306 is provided at the LSU 227d nearest to the thermally fixing means 217 to detect only the temperature of the LSU 227d, so that the control section 305 controls the exhaust fans 303, 304 and the heat source 217a of the thermally fixing means 217 on the basis of this detection. As compared with a configuration where temperature sensors are individually mounted to the other LSUs 227a to 227c, the number of parts such as a temperature sensor can be reduced and increase in manufacturing cost can be suppressed to be low while influence on an image due to heats of the LSUs 227a to 227d is being suppressed effectively. By detecting the temperature of the LSU 227d nearest to the thermally fixing means 217, temperature states of the LSUs 227a to 227c which are farther from the thermally fixing means 217 can be grasped (i.e., inferred from that of 227d) without detecting the temperatures of the LSUs 227a to 227c directly.

In another embodiment, forced draft fans for forcing air into the space portions 301, 300 from the outside of the apparatus may be used instead of the exhaust fans 303, 304.

Still another embodiment of the invention, the control section 305 maybe configured so as to control the rotation speed of only the fan 303 or the fan 304 or control the rotation speeds of both the fans 303, 304 in response to an output of the temperature sensor 306. The control section 305 responding to the output of the temperature sensor 306 may be configured so as to maintain only the temperature in the thermally fixing means 217 at a temperature suitable for thermal fixing, while the temperature of the heat source 217a of the thermally fixing means 217 is controlled to a temperature suitable for thermal fixing by another control means, thereby preventing poor fixing or fusing from occurring.

In the light-scanning-unit space portion 301, air holes may not be formed, and air may be introduced into or exhausted from the light-scanning-unit space portion 301 from clearances between the partition member and the like.

FIG. 5 is an enlarged and simplified front view showing a section including the space portions 300, 301, the image forming section 210, the transferring/conveying belt mechanism 213 and the thermally fixing means 217 of a digital copying machine la of another embodiment of the invention. Incidentally, the configuration of the copying machine 1a is similar to that of the copying machine 1, wherein like elements or members are denoted by like reference numerals and explanation thereof will be omitted.

The fixing-side space portion 300 is formed above the thermally fixing means 217, the LSU side space portion 301 is formed above the image forming section 210, and the respective space portions 300, 301 are isolated by the partition wall 310. Also, the space portions 300 and 301, and the thermally fixing means 217 and the image forming section 210 disposed below the space portions are isolated by the bottom plate 311. The copying machine 1a is characterized in that an opening portion 311b is formed in a bottom plate 311a on the side of the space portion 300 and that at an end portion of the opening portion 311b of the bottom plate 311a, an extending piece 311c extending downward therefrom is formed.

The exhaust fan 303 for exhausting air to the outside of the apparatus at the rear side of the copying machine 1a is provided to the space portion 301. Air inside the space portion 301 which has been heated up due to heat from the thermally fixing means 217 is exhausted to the outside of the apparatus by rotation of the exhaust fan 303, so that the LSUs 227a to 227d within the space portion 301 is air-cooled. Also, the exhaust fan 304 for exhausting air to the outside of the apparatus at the rear side of the copying machine 1a is provided to the space portion 300. Air inside the space portion 300 which has been heated up due to heat from the thermally fixing means 217 is exhausted to the outside of the apparatus by rotation of the exhaust fan 304, so that the thermally fixing means 217 is air-cooled.

In an actual copying machine, here, for reducing a color shear on a color image formed, it is preferable that differences in temperature among the respective LSUs 227a to 227d are small. In the copying machine 1a, the exhaust fan 303 is provided to cool the LSUs 227a to 227d inside the space portion 301 and air within space portion 300 is exhausted by the exhaust fan 304 so that the temperature inside the space portion 301 can be further lowered. Furthermore, the exhaust fan 303 is provided on the side of the thermally fixing means 217 with the higher temperature, so that it is made possible to cool the LSU nearer to the thermally fixing means 217 to a lower temperature. Accordingly, differences in temperature among the respective LSUs 227a to 227d can be made small and a color shear on a color image formed can be reduced.

Also, for preventing wasted toner from melting or fusing and solidifying, it is preferable that the temperature of the image forming section 210 is lower. In the copying machine 1a, since the opening portion 311b is provided at the bottom plate 311a on the side of the space portion 300, air below the space portion 300 is sucked into the space portion 300 by rotation of the exhaust fan 304, so that an upward air flow, or an air curtain, is formed between the image forming section 210 and the thermally fixing portion 217. The image forming portion 210 is cooled by the air curtain so that increase in temperature of the image forming section 210 can be suppressed.

Furthermore, for reducing power consumption and stabilizing fixing or fusing performance to obtain a high image quality, it is preferable that temperature generated at the thermally fixing means 217 is maintained. In the copying machine 1a, since at an end portion of the opening portion 311b of the bottom plate 311a, the projecting piece 311c extending downward therefrom is provided, a space of an air layer where there is no air flow generated by an exhaust fan or the like is formed above the thermally fixing means 217. Due to this space, a heat insulating effect for the thermally fixing means 217 is obtained so as to maintain temperature of the thermally fixing means is held. Accordingly, reduction in power consumption and stabilization in fixing performance are allowed in the copying machine 1a. Incidentally, in FIG. 5, it is preferable to constitute the side wall 105, side plate 107, the partition wall 310 and the bottom plate 311 which are illustrated with oblique lines with heat insulating material, since the temperature holding effect of the thermally fixing means 217 can be further enhanced, and reduction in power consumption and stabilization in fixing performance can be facilitated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A color image forming apparatus comprising:
  (a) a plurality of image forming means for respective colors, sequentially disposed along a conveying path of a recording medium, each of the plurality of image forming means comprising:
    a photosensitive body,
    an individual light-scanning unit for forming an electrostatic latent image on the photosensitive body,
    developing means for visualizing the electrostatic latent image on the photosensitive body with color toners, and
    transferring means for transferring a toner image formed on the photosensitive body via the conveying path to the recording medium;
  (b) thermally fixing means, disposed further downstream from the image forming means that is arranged farthest downstream on the conveying path in a conveying direction of the recording medium, for thermally melting a toner image on the recording medium to fix the toner image on the recording medium;
  (c) partition members for surrounding at least all of the associated light-scanning units of the image forming means so as to form a light-scanning-unit space portion which isolates the light-scanning-unit space from the thermally fixing means; and
  (d) a fan, disposed in a vicinity of the light-scanning unit that is nearest to the thermally fixing means, for guiding air between and around each of the plurality of light-scanning units within the light-scanning-unit space portion to an outside of an apparatus body, or for guiding air from the outside of the apparatus body into the light-scanning-unit space portion between and around each of the light-scanning units.

2. The color image apparatus of claim 1, wherein an air hole for introducing or exhausting air is formed at a position of the light-scanning-unit space portion which is farthest from the thermally fixing means.

3. The color image apparatus of claim 1, wherein the partition members form a thermal-fixing-side space portion above the thermally fixing means,
  the color image forming apparatus further comprising a second fan for guiding air from the thermal-fixing-side space portion to the outside of the apparatus body and from the outside of the apparatus body in to the thermal-fixing-side space portion.

4. The color image apparatus of claim 3, wherein the first and second fans are disposed in adjacent relation on a rear surface of the color image apparatus, in the vicinity of both the thermally fixing means and the light scanning unit that is nearest to the thermally fixing means.

5. The color image forming apparatus of claim 1, further comprising:
  a temperature sensor for detecting a temperature in a vicinity of the light-scanning unit that is nearest to the thermally fixing means; and
  control means, in response to an output of the temperature sensor, for controlling rotation speed of the fan of the light-scanning-unit space portion, or of the thermal-fixing-side space portion to prevent the temperature in the vicinity of the light-scanning unit nearest the thermally fixing means from increasing to a predetermined value or above.

6. The color image apparatus of claim 1, wherein the fan is disposed on a rear surface of the color image apparatus, generally between the thermally fixing means and the light scanning unit that is nearest to the thermally fixing means.

7. A color image forming apparatus comprising:
  (a) a plurality of image forming means for respective colors, sequentially disposed along a conveying path of a recording medium, each of the plurality of image forming means comprising:
    a photosensitive body,
    an individual light-scanning unit for forming an electrostatic latent image on the photosensitive body,
    developing means for visualizing the electrostatic latent image on the photosensitive body with color toners, and
    transferring means for transferring a toner image formed on the photosensitive body via the conveying path to the recording medium;
  (b) thermally fixing means, disposed further downstream from the image forming means that is arranged farthest downstream on the conveying path in a conveying direction of the recording medium, for thermally melting a toner image on the recording medium to fix the toner image on the recording medium;
  (c) a partition member composed of one or more sections for surrounding at least all of the associated light-scanning units of the image forming means so as to form a light-scanning-unit space portion, and including a thermally fixing side space portion located above the thermally fixing means which also isolates the light-scanning-unit space portion from the thermally fixing means,
    wherein one of the sections of the partition member is provided with an opening arranged between the thermally fixing means and the light-scanning-unit space portion;
  (d) a first fan, disposed in a vicinity of the light-scanning unit nearest to the thermally fixing means in the light-scanning-unit space portion, for guiding air between and around each of the plurality of light-scanning-units within the light-scanning-unit space portion to an outside of an apparatus body, or for guiding air from the outside of the apparatus body to the light-scanning-unit space portion between and around each of the light-scanning-units; and
  (e) a second fan, disposed in the thermally fixing side space portion, for guiding air from the thermally fixing side space portion to the outside of the apparatus body or guiding air from the outside of the apparatus into the thermally fixing side space portion.

8. The color image forming apparatus of claim 7, wherein the partition member is formed of heat insulating material.

9. The color image apparatus of claim 7, wherein the first and second fans are disposed in adjacent relation on a rear surface of the color image apparatus, in the vicinity of both the thermally fixing means and the light scanning unit that is nearest to the thermally fixing means.

10. A color image forming apparatus, comprising:
  a plurality of image forming stations arranged in adjacent relation above a conveyor belt which conveys at least one recording sheet through each of the image forming stations sequentially in order to form a toner image on the sheet, wherein each of the image forming stations include a photosensitive drum, a developing device and an associated light scanning unit disposed above the drum and developing device in order to form and transfer a particular color component of the toner image onto the recording sheet;
  a thermal fixing device that is disposed downstream of the image forming station that is farthest downstream in the conveying direction for thermally melting the toner image onto the sheet; and
  a first fan that is located proximate the thermal fixing device and the image forming station that is nearest the thermal fixing device along the conveyer,
    wherein each of the light scanning units are isolated from their corresponding drum and developing unit, as well as from the thermal fixing device by a plurality of partitions which creates a first air space surrounding all of the light scanning units and a second enclosed air space located next to the first air space and above the thermal fixing device, and
    wherein the first fan is configured to guide air between and around each of the plurality of light scanning units within the first air space to outside the color image apparatus, and to guide air from outside the apparatus between and around each of the light scanning units.

11. The apparatus of claim 10, wherein the thermal fixing device includes a heat source, the apparatus further comprising:
  a second fan provided in substantially adjacent relation to the first fan to circulate air in the second air space and,
  a control section which controls each of the first fan, second fan and heat source to control temperature within the apparatus.

12. The apparatus of claim 11,
  wherein the light scanning unit of the image forming station that is nearest the thermal fixing device along the conveyer has a temperature sensor attached thereto, and
  wherein rotation speeds of the first and second fans are controlled by the control device, based on the output of the temperature sensor.

13. The apparatus of claim 11, wherein the first and second fans are configured to ensure that differences in temperatures among each of the light scanning units are small to thereby limit or reduce color shear of a color image.

14. The apparatus of claim 10, wherein the first and second fans are forced draft fans.

15. The apparatus of claim 10, wherein the first and second fans are exhaust fans.

16. The apparatus of claim 10,
  wherein the light scanning unit of the image forming station that is nearest the thermal fixing device along the conveyer has a temperature sensor attached thereto, and
  wherein rotation speeds of the first fan is controlled based on the output of the temperature sensor.

17. The apparatus of claim 10, wherein the thermal fixing device includes a heat source, the apparatus further comprising:
  a second fan provided in substantially adjacent relation to the first fan to circulate air in the second air space and,
  a first control section which controls only the first and second fans based on a detected temperature, and
  a second control section to control temperature of the heat source so that it remains at a temperature that is suitable for thermal fixing.

18. The apparatus of claim 10, wherein an opening is provided at the bottom of the second enclosed air space so that an upward air flow occurs between the thermal fixing device and the nearest image forming station.

19. The apparatus of claim 18, wherein a portion of a partition that serves as a wall of the second enclosed air space extends in a downward direction to provide the opening, so as to create a heat insulating effect around the thermal fixing device to maintain temperature of the thermal fixing device.

20. The apparatus of claim 10, wherein the plurality of partitions are formed of heat insulating material.

* * * * *